(12) United States Patent
Alassafi et al.

(10) Patent No.: US 11,194,987 B1
(45) Date of Patent: Dec. 7, 2021

(54) FINGERPRINT RECORDING DEVICE WITH SOUND PLAY ELEMENT FOR INFANTS

(71) Applicant: King Abdulaziz University, Jeddah (SA)

(72) Inventors: Madini O. Alassafi, Jeddah (SA); Abdulrahman A. Alshdadi, Jeddah (SA); Mohammed Saeed Alkatheiri, Jeddah (SA); Mohammed Ali Alqarni, Jeddah (SA); Muhammad Murtaza Khan, Jeddah (SA); Abdulrahman H. Altalhi, Jeddah (SA); Hadi Mohsen Oqaibi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/408,704

(22) Filed: Aug. 23, 2021

Related U.S. Application Data

(60) Division of application No. 17/337,482, filed on Jun. 3, 2021, now Pat. No. 11,138,405, which is a continuation of application No. 17/104,794, filed on Nov. 25, 2020, now Pat. No. 11,100,307.

(51) Int. Cl.
*G06K 9/00* (2006.01)
(52) U.S. Cl.
CPC .............................. *G06K 9/00026* (2013.01)
(58) Field of Classification Search
None
See application file for complete search history.

(56) References Cited

U.S. PATENT DOCUMENTS

| | | |
|---|---|---|
| 6,028,950 A | 2/2000 | Merjanian |
| 7,047,419 B2 | 5/2006 | Black |
| 7,298,242 B2 | 11/2007 | Fujita |
| 10,967,837 B1 | 4/2021 | Schulz |
| 2004/0208349 A1 | 10/2004 | Ide |
| 2005/0100197 A1 | 5/2005 | Kita |
| 2017/0279948 A1 | 9/2017 | Hong |
| 2018/0178760 A1 | 6/2018 | Lee |
| 2018/0180169 A1 | 6/2018 | Lee |
| 2018/0196988 A1 | 7/2018 | Tse |
| 2018/0342052 A1 | 11/2018 | Higuchi |
| 2019/0341954 A1 | 11/2019 | Zalewski et al. |

OTHER PUBLICATIONS

Benisty, et al. ; Flat-Format Lens-Free Imaging Using an Organic Sensor With Guided Illumination and Application to Fingerprints ; IEE Journal of Selected Topics in Quantum Electronics vol. 22, Issue 1 ; Jun. 9, 2015 ; Abstract Only ; 5 Pages.

*Primary Examiner* — Nicholas J Lee
(74) *Attorney, Agent, or Firm* — Oblon, McClelland, Maier & Neustadt, L.L.P.

(57) ABSTRACT

A fingerprint scanner for capturing fingerprints of infant children is described. The fingerprint scanner includes a transparent tube configured for an infant child hand and an array of camera sensors spaced apart on the transparent tube so that each camera sensor captures an overlapping part of an image captured by its neighboring camera sensor. The array of camera sensors is arranged below a surface, along a periphery of a circumference and substantially along a length of the transparent tube up to a processor compartment. The fingerprint scanner also includes a processing circuitry configured to: simultaneously receive multiple images from the array of camera sensors, and process the multiple images including merging the multiple images to remove overlapping portions and recover a single image of the infant child's fingertips and palm.

4 Claims, 11 Drawing Sheets

FINGERPRINT RECORDING DEVICE WITH SOUND PLAY ELEMENT FOR INFANTS

CROSS-REFERENCE TO RELATED APPLICATIONS

The present application is a Continuation of U.S. application Ser. No. 17/337,482, now allowed, having a filing date of Jun. 3, 2021, which is a Continuation of U.S. application Ser. No. 17/104,794, now U.S. Pat. No. 11,100,307, having an issue date of Aug. 24, 2021, having a filing date of Nov. 25, 2020.

TECHNICAL FIELD

The present disclosure is directed to fingerprint acquisition, and, more particularly, to a fingerprint acquisition system for children using a multicamera array.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Fingerprints are unique to each individual person and typically remain the same for life. As a result, fingerprints have been used as a means for identifying, recognizing, and/or authenticating a person. Various fingerprint sensors have been developed in the past few years. A fingerprint sensor is an electronic device designed to capture an image of a fingerprint of a user. The user is required to place his or her finger on a sensing area of the fingerprint sensor. The captured image is processed to create a fingerprint template (a collection of extracted fingerprint features) which is stored and used for matching.

An ergonomic fingerprint reader apparatus was described in U.S. Pat. No. 5,546,471A. However, utilizing the fingerprint reader apparatus as described in the U.S. Pat. No. 5,546,471A to acquire fingerprints is easy for adults but cumbersome for children.

U.S. Pat. No. 6,289,116B1 described a fingerprint sensor for acquiring images of fingerprint. Further, a fingerprint recognition system was described in U.S. Pat. No. 6,125,192A and a capacitive fingerprint acquisition system was described in U.S. Pat. No. 6,016,355A. However, these systems may not be useful for acquiring fingerprints of infants as the infants may not be able to keep their fingers still while the acquisition device moves and captures the images of the fingers. Another issue associated with such fingerprint systems is that they require a user to put significant amount of pressure on the fingerprint sensor for fingerprint acquisition which is not possible for infants.

A finger sensing apparatus was described in U.S. Pat. No. 7,146,024B2. For acquisition of fingerprint as per U.S. Pat. No. 7,146,024B2 an individual is required to move or slide his or her finger on the finger sensing apparatus while the finger sensing apparatus remains static. It may be cumbersome or challenging to ensure that infants and/or children move their fingers in a consistent smooth motion for fingerprint acquisition.

Methods for fingerprint recognition of young children was described in "*Fingerprint Recognition of Young Children*", Anil K. Jain, Sunpreet S. Arora, Kai Cao, Lacey Best-Rowden, and Anjoo Bhatnagar, IEEE, December 2016, incorporated herein by reference in its entirety. Further, a non-contact optical imaging fingerprint was described in U.S. Pat. No. 6,853,444B2. The references proposed a use of mobile phone cameras for obtaining fingerprints of children. However, to capture images of fingers or fingerprints using the mobile phone cameras, children are required to keep their hands still and open. Children generally do not comply or cooperate for acquisition of fingerprints by holding theirs hand open especially when they are infants. Typically, an operator would be needed to open child's closed hand until multiple images of the hand are captured. In most cases, it is difficult to keep the child's hand open and at a fixed location for more than a few seconds. As a result, good quality image of the child's finger or fingerprint may not be captured. Another idea was to use MEMS ultrasound fingerprint system as was described in U.S. Ser. No. 10/430,631B2.

A fingerprint sensor (ZAK-110) was described in "*Advances in Capturing Child Fingerprints: A High Resolution CMOS Image Sensor with SLDR Method*" Koda, Y.; Higuchi, T.; and Jain, A, 2016. The process of fingerprint acquisition in the above reference requires an operator to hold the fingerprint sensor in one hand and a child's finger on the fingerprint sensor with the other hand. Also, the reference describes capturing one fingerprint at a time. Obtaining fingerprints of an infant or a child through the operator's effort may be distressing for the infant or the child. Also, the process is a time-consuming process and cumbersome for the infant or the child.

Thus, conventional fingerprint sensors suffer from limitations which hamper their wide-spread use. Particularly, it is difficult to obtain fingerprints of children and specially infants using conventional fingerprint sensors as a majority of conventional fingerprint sensors are designed to sense adult fingers. Also, most children (particularly infants and toddlers) do not place their fingers on the fingerprint sensors on their own. It is difficult to force infants and toddlers to place their fingers properly on the fingerprint sensors for more than a few seconds. As a result, often there is insufficient time for the fingerprint sensors to capture good quality images. Consequently, these conventional fingerprint sensors do not have capability to capture fingerprints of children (particularly infants and toddlers) efficiently and accurately.

Accordingly, it is one object of the present disclosure to provide an improved fingerprint sensor that can be easily held by children and that can be used to accurately acquire fingerprints of all fingers.

SUMMARY

In an exemplary embodiment, a fingerprint scanner for capturing fingerprints of infant children is described, including a transparent tube configured for an infant child hand, an array of camera sensors spaced apart on the transparent tube so that each camera sensor captures an overlapping part of an image captured by its neighboring camera sensor, wherein the array of camera sensors is arranged below a surface, along a periphery of a circumference and substantially along a length of the transparent tube up to a processor compartment, and a processing circuitry configured to simultaneously receive multiple images from the array of camera sensors, and process the multiple images including merging the multiple images to remove overlapping portions and recover a single image of the infant child's fingertips and palm.

The foregoing general description of the illustrative aspect of the present disclosures and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
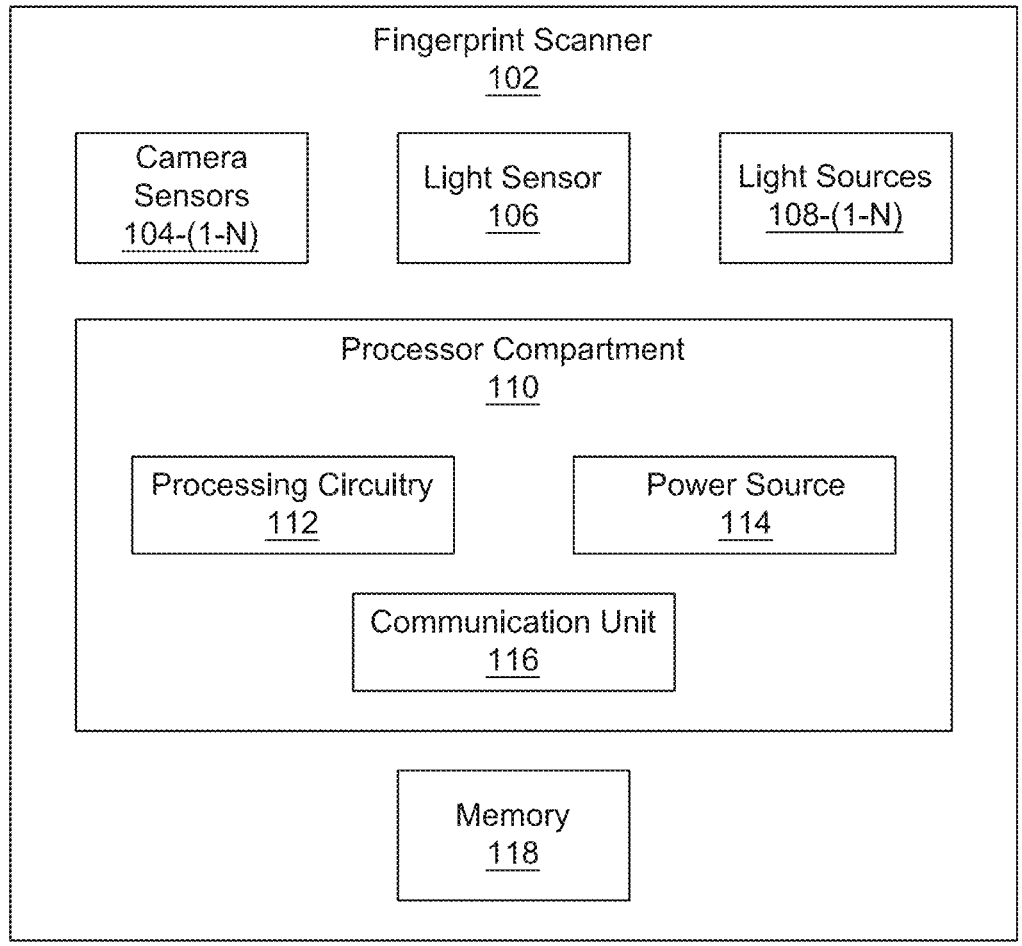
FIG. 1 shows a block diagram depicting a fingerprint scanner for capturing fingerprints of children, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a fingerprint scanner for capturing fingerprints of children. The fingerprint scanner is designed in such a way that it can be easily held by children of 7 years of age and younger. Also, the fingerprint scanner is capable of simultaneously acquiring fingerprints of all fingers and/or palmprint.

In an example, the fingerprint scanner may be used by hospitals and various other institutions such as private clinics and heath organizations to acquire fingerprints and/or palmprints (interchangeably referred to as biometric data) of infant children for maintaining record of their vaccinations. For example, the hospitals may maintain the biometric data in a national database or a global database. In an example, the global database may include fingerprints of children around the world. In some examples, the biometric data may be used at immigration for checking the identity of children. For example, an immigration team may compare the biometric data of the children against missing children to prevent child trafficking/abduction. Also, in an example, the biometric data may be used in schools to mark attendance of children.

Although, the fingerprint scanner of the present disclosure can capture fingerprints and palmprints of children who are 7 years of age or younger, the fingerprint scanner 102 is capable of capturing fingerprints and palmprints of children of more than 7 years of age, and adults.

FIG. 1 shows a block diagram depicting a fingerprint scanner 102, according to aspects of the present disclosure. In some aspects of the present disclosure, the fingerprint scanner 102 may include an array of camera sensors 104-1 to 104-N (also referred to herein as camera sensors 104), a light sensor 106, a plurality of light sources 108-1 to 108-N (also referred to as light sources 108), a processor compartment 110 including a processing circuitry 112, a power source 114, and a communication unit 116, and a memory 118. The array of camera sensors 104 includes two or more camera sensors 104-1 to 104-N.

In an aspect of the present disclosure, the fingerprint scanner 102 may be designed in a form of a toy having a tube (handle) to enable comfortable grasping by children. The fingerprint scanner 102 may be designed to illuminate and capture images of fingers and/or palm of the children for acquisition of fingerprints and/or palmprints. The fingerprint scanner 102 is configured to capture fingerprints and/or palmprints of young children, such as infants and toddlers.

Figure 2:
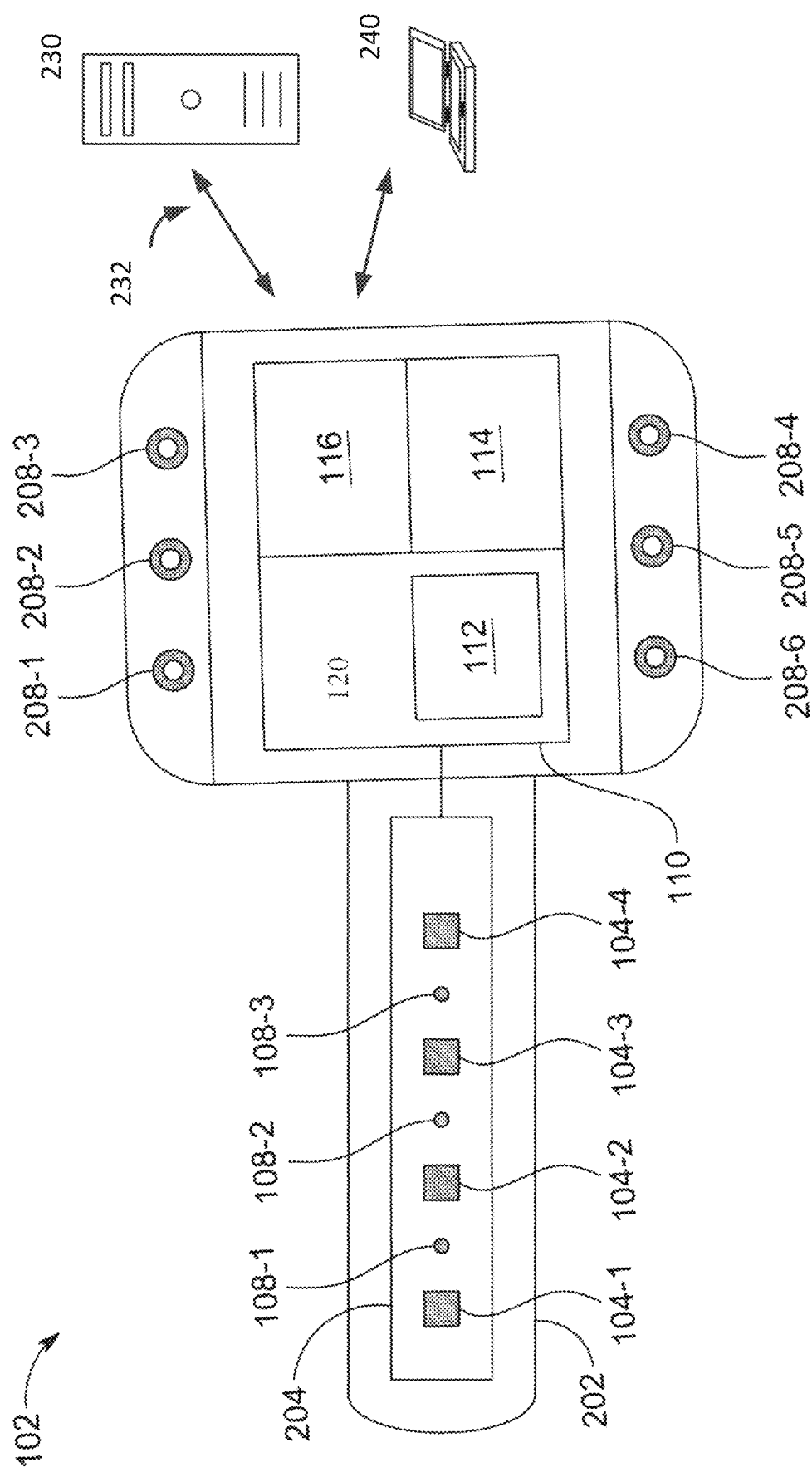
FIG. 2 shows a perspective view of the fingerprint scanner with an external computer, according to aspects of the present disclosure.
Figure 3:
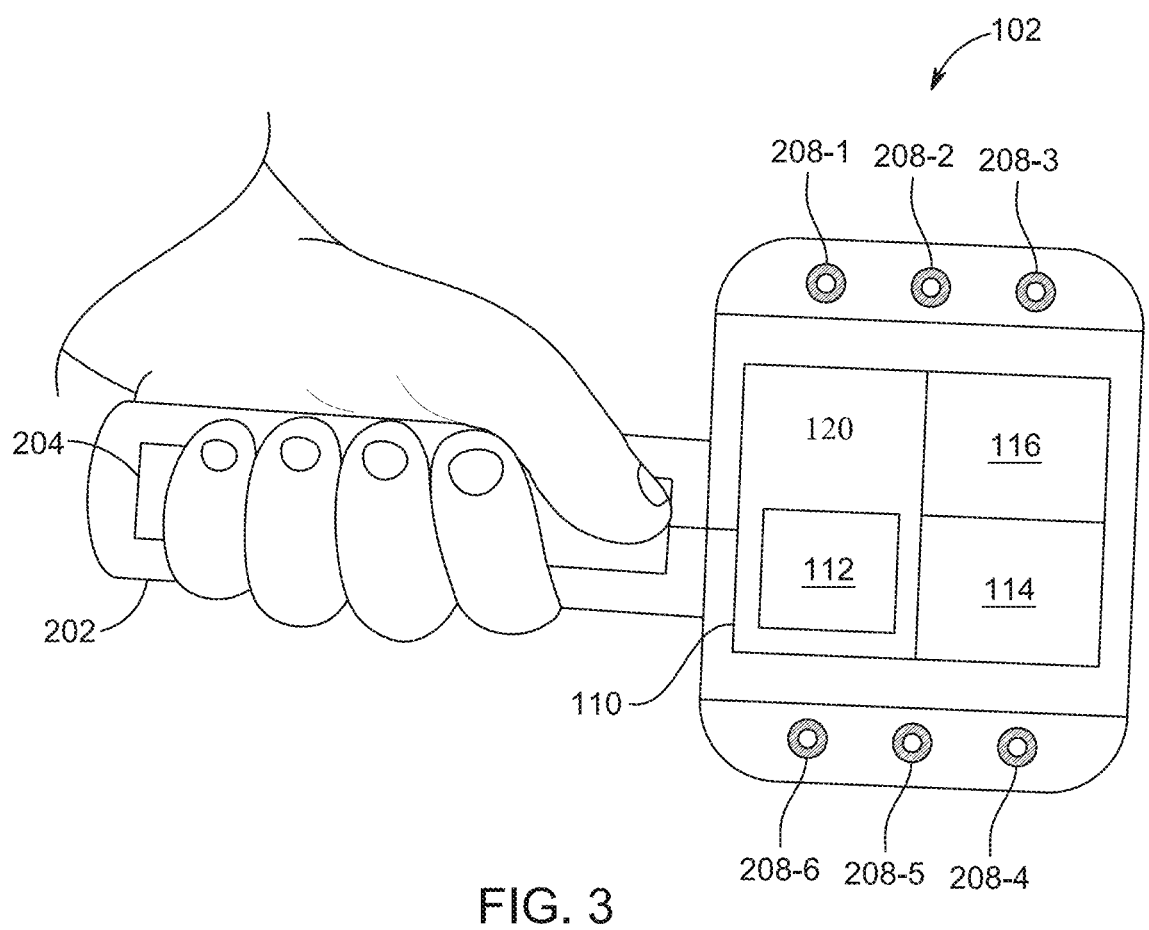
FIG. 3 shows the fingerprint scanner being held by a child, according to aspects of the present disclosure.

FIG. 2 shows a perspective view of the fingerprint scanner 102, according to aspects of the present disclosure. The fingerprint scanner 102 is user friendly and is designed based upon the nature/way of children holding their parents'/caregivers' finger. In some aspects of the present disclosure, the fingerprint scanner 102 is designed in a form of a toy, such as a rattle or a movement activated light up toy, to engage and encourage the child to play for some time. In an example, the fingerprint scanner 102 may be designed with a lightweight construct, and is easy to grasp. For example, infant children can easily hold the fingerprint scanner 102 by wrapping their fingers i.e., hand around the fingerprint scanner 102. According to an aspect of the present disclosure, fingerprints and/or palmprints of the children can be acquired while the children play with the fingerprint scanner 102. The fingerprint scanner 102 can be held in a child's hand, for example as shown in FIG. 3.

Since the fingerprint scanner 102 is designed in a form of a toy that can be easily held by a child, i.e., the child can hold the fingerprint scanner 102 by wrapping his or her fingers (hand) around the fingerprint scanner 102, the need of an operator to hold the child's hand or fingers for fingerprint acquisition is minimal or eliminated. Further, the fingerprints and the palmprint of the child can be acquired simultaneously while the child plays with the fingerprint scanner 102. Since multiple camera sensors 104 are used in the fingerprint scanner 102, multiple images of high resolutions are captured to generate fingerprints of all five fingers and/or palmprint. The fingerprint scanner 102 acquires the fingerprints and the palmprints accurately and in a time efficient manner. Thus, performance of the fingerprint scanner 102 is an improvement over conventional fingerprint scanners that require sliding of fingers over a sensing area or temporal data acquisition.

Referring back to FIG. 2, the fingerprint scanner 102 includes a tube 202. According to some aspects of the present disclosure, the tube 202 is to be held by children (such as children of 7 years and younger, and in particular infant children). The tube 202 may have a cylindrical structure. In an example, the children can hold the tube 202 in their palm, wrapping their fingers around the tube 202. In one embodiment, the tube 202 may be of a size of approximately 0.5 to 1.0 cm in diameter. In some aspects of the present disclosure, the tube 202 may be of size of approximately 1.0 to 3.0 cm in diameter. Further, in some aspects of the present disclosure, the tube 202 may be of size of approximately 3.0 to 5.0 cm in diameter. The size of the tube 202 is designed such that the tube can be held comfortably by children of various age groups, that is, from infants to children of 7 years of age.

In some aspects of the present disclosure, the tube 202 may be made of a transparent material and may interchangeably be referred to as the transparent tube. In one example, the tube 202 may be made of glass. In another example, the tube 202 may be made of a transparent plastic, such as polypropylene, PET or polycarbonate. In yet another example, the tube 202 may be made of a transparent ceramic material, such as spinel or yttrium aluminum garnet (YAG). In yet another example, the tube 202 may be made of transparent conducting oxides (TCOs). In other aspects of the present disclosure, the tube 202 may be made of a translucent material to enable capture of the fingerprint and/or the palmprint. Although other known transparent or translucent materials and implementations of the tube 202 are contemplated herein, these need not be described in full within this disclosure for the sake of brevity. Further, in some implementations, instead of having the tube of cylindrical structure, the fingerprint scanner 102 may be designed to include any holding means of a desired shape and size.

Further regarding FIG. 2, the fingerprint scanner 102 includes an array of camera sensors 104-1, 104-2, 104-3, and 104-4 (104) and associated light sources 108-1, 108-2, and 108-3 (108). Also, the fingerprint scanner 102 includes a platform such as a printed circuit board (PCB) 204 on which the camera sensors 104 and the light sources 108 may be mounted.

The array of camera sensors 104 may be configured to capture images of palm or fingers or portions thereof of users (for example, infant children) holding the fingerprint scanner 102. In an example, when the fingerprint scanner 102 is held by an infant child, the camera sensors 104-1 to 104-N capture images of fingertips and/or palm of the infant child. The camera sensors 104-1 to 104-N may be placed in a variety of array arrangements, preferably embedded into a thermoplastic tube with a transparent thermoplastic or ceramic or glass window flush with the surface of the tube. In an implementation, each camera sensor of the array of camera sensors 104 may be enabled to operate independently of other camera sensors. In another implementation, each camera sensor of the array of camera sensors 104 may be enabled to operate in conjunction with other camera sensors. In some aspects of the present disclosure, each camera sensor of the array of camera sensors 104 may be arranged such that neighboring camera sensors can have partial overlapping fields of view. In some aspects of the present disclosure, each camera sensor of the array of camera sensors 104 may be placed to have a distinctive field of view. The camera sensors 104 may be arranged in multiple arrays. In an aspect of the present disclosure, the camera sensors 104 may capture the images simultaneously. In other aspects of the present disclosure, the camera sensors 104 may capture the images at different time intervals, for example, in a series or at random.

According to an aspect of the present disclosure, the array of camera sensors 104 may be mounted/arranged on a platform placed inside the tube 202, below an inner surface of the tube facing outwards to capture images through the tube. Also, the camera sensors 104 are arranged below the surface, along a periphery of a circumference and substantially along a length of the tube 202 up to the processor compartment 110. In an example implementation, a processor compartment 110 may be located at an end of the tube 202.

In an example, the array of camera sensors 104 may include a 2×1 camera sensor array, a 2×2 camera sensor array, a 4×1 camera sensor array, an 8×1 camera sensors array, or any other suitable arrangement of camera sensors. In one example, the array of camera sensors 104 may include multi-camera sensor arrays, where the three arrays of camera sensors are arranged in a polygonal cross-section shape, including triangle, square, pentagon, hexagon. For example, each array of camera sensors may be placed on a corresponding flat surface of the platform with the flat surfaces arranged in a form of a triangle. In another example, the array of camera sensors 104 may include six camera sensor arrays, where each array of the six camera sensors is arranged on a corresponding surface of the platform shaped in a form of hexagon. For example, each array of camera sensors may be placed on a corresponding flat surface of the platform with the flat surfaces arranged in a form of a hexagon. In an example, a total number of camera sensors 104 and a total number of arrays of camera sensors 104 in the fingerprint scanner 102 may be based on a size of the camera sensors 104 and a size of the tube. One or more arrays of the camera sensors 104 are arranged so that images of a complete hand of a user can be captured both horizontally and vertically when the hand is wrapped around the tube 202.

According to an aspect of the present disclosure, the camera sensors 104 may be placed relative to each other in a line such that each camera sensor may be configured to capture an overlapping part or portion of an image captured by its neighboring camera sensor. In an example, each camera sensor may be arranged in such a way that a complete hand of a user can be optimally captured both horizontally and vertically when the hand is wrapped around the tube.

In some aspects of the present disclosure, the plurality of light sources 108 is placed in between camera sensors of the array of camera sensors 104 for illuminating a portion of the hand holding the tube. In some aspects of the present disclosure, the light sources 108 may be located alongside the camera sensors 104. The light sources 108 may be configured to provide illumination for capturing images when there is a lack of ambient light or due to blocking of light by the hand while holding the tube. In an example implementation, the light sensor 106 may trigger the light sources 108 to 'ON' state when there is a lack of ambient light. The light sources 108 may illuminate the hand of the user. In an example, as the user closes his or her hand around the tube, the light sources 108 may be turned ON to illuminate the hand. Thus, the light sources 108 allow for even lighting of the hand of the user and allowing the camera sensors 104 to capture clear fingerprint and/or palmprint images. In an example, the light sources 108 may emit light, preferably of a green wavelength band. For example, using a green light for illumination of the hand may result in clear and sharp fingerprint and/or palmprint images. In other examples, the light sources 108 may emit light of different colors in order to improve clarity and sharpness of the images. In some aspects of the present disclosure, the light sources 108 may be infrared light sources.

In an example, each of the camera sensors 104 may be an ultra-miniature high definition mega-pixel camera that produces a high-resolution image. Further, each of the camera sensors 104 may have a small focal length and nearly infinite depth of field. In an example, the camera sensors 104 may be nanoCam™. Further, in an example, the light sources 108 includes Light Emitting Diodes (LEDs). Although, it has been described that the fingerprint scanner 102 includes light sources 108 for illuminating the hand of the user such that the camera sensors 104 can capture clear image of the hand, in some aspects of the present disclosure, the camera sensors 104 may have an in-built light source and may not need any external light source. An example of such cameras includes cameras that are used for endoscopy. Accordingly, when camera sensors with an in-built light source are used in the fingerprint scanner 102, some amount of space is saved in the fingerprint scanner 102, allowing the addition of more camera sensors to the fingerprint scanner 102.

Referring back to FIG. 2, the fingerprint scanner 102 includes a tube 202 and four camera sensors 104-1, 104-2, 104-3, and 104-4. Further, the fingerprint scanner 102 includes three light sources 108-1, 108-2, and 108-3. In a preferable embodiment each light source emits mainly light of a frequency that is generally outside the frequencies of light emitted by the other light sources, e.g., a first light source emitting in the infrared region down to about 650 cm$^{-1}$, a second light source emitting in the UV spectrum and up to 400 cm$^{-1}$ and a third light source emitting generally in the visible spectrum 400-700 cm$^{-1}$. As can be seen in FIG. 2, the light source 108-1 is placed in between the camera sources 104-1 and 104-2, the light source 108-2 is placed in between the camera sources 104-2 and 104-3, and the light source 108-3 is placed in between the camera sources 104-3 and 104-4. Also, the fingerprint scanner 102 includes the platform such as a printed circuit board (PCB) 204 on which the camera sources 104-(1-4) and the light sources 108-(1-3) may be mounted. In one example, the PCB 204 may be a single-sided PCB. In another example, the PCB 204 may be a double-sided PCB. Although, it has been shown that the fingerprint scanner 102 of FIG. 2 includes four camera sensors 104-(1-4) and three light sources 108-(1-3), in some aspects of the present disclosure, the fingerprint scanner 102 may include more than or less than four camera sensors. Similarly, the fingerprint scanner 102 may include more than or less than three light sources.

The fingerprint scanner 102 further includes the processor compartment 110. In an example, the processor compartment 110 is located in an end of the tube 202 and the PCB 204 may be connected to the processor compartment 110 to provide an output data to the processor compartment 110 for further processing or use. Also, the camera sensors 104-(1-4) are arranged below a surface, along a periphery of a circumference and substantially along a length of the tube 202 up to the processor compartment 110.

As shown in FIG. 2, the processor compartment 110 includes the processing circuitry 112, power source 114, and communication unit 116.

In some aspects of the present disclosure, the images captured by the camera sensors 104 may be stored in the memory 118. The memory 118 may be an external memory device, such as a Flash drive, SD card, or the like. In some implementations, the memory 118 may be implemented within the processor compartment 110.

Further, in some aspects of the present disclosure, the captured images may be collected in the processing circuitry 112. However, due to space limitations, a small footprint computer device may be mounted in the processor compartment 110, while processing of the multiple overlapping images or exclusive images captured by the array of camera sensors 104 may be performed at an external device or a remote device that may be connected to the fingerprint scanner 102 wirelessly 232 or via wired links. In an example, the external device may be any computing device, such as a desktop computer 230, a laptop computer 240, a tablet computer, a mobile device, a personal digital assistant (PDA) or any other computing device.

The small footprint computer device may be a printed circuit board computer device, for example, an Arduino Nano (in particular, Arduino Nano BLE which includes a built-in Bluetooth communications module). A current configuration of an Arduino Nano BLE includes a microcontroller, digital I/O pins, analog input pins, 1 MB KB Flash Memory, 256 KB SRAM.

As shown in FIG. 2, the processor compartment 110 includes the communication unit 116 to facilitate communication between the fingerprint scanner 102 and the external computer device 230, 240. In an example, the communication unit 116 may be a Wifi transmitter, a Bluetooth transmitter, a USB port, or any other known wired or wireless transmitter. In an aspect of the present disclosure, the communication unit 116 may be configured to transmit the multiple images captured by the camera sensors 104-(1-4) to the external device 230, 240 remotely for further processing. According to some aspects of the present disclosure, an operator of the fingerprint scanner 102 may facilitate the transmission of the multiple images to the external computer device 230, 240.

The communication unit 116 may transmit data such as the multiple images captured by the camera sensors 104, diagnostic information of the fingerprint scanner 102, a memory status, a power status, and the like. Also, the communication unit 116 may receive data such as the processed images, software/firmware updates, instructions to manage memory, and the like. In an example, the communication unit 116 may include a circuitry, memory and other hardware to enable efficient communication with the external devices. The communication unit 116 may include a wired communication component as well as a wireless communication component. The wired communication component may include a port for connecting with external devices or power sources such as a Universal Serial Bus (USB) port or proprietary modules. The wireless communication component may include a Wifi transmitter, a Bluetooth transmitter, or any other known or proprietary wireless transmitter.

The power source 114 may be any source that provides/supplies power to the fingerprint scanner 102. In one embodiment, the power source 114 may be a battery power source. In an example, the power source 114 may include one or more batteries that provide desired power for operation of the fingerprint scanner 102. In an example, the one or more batteries may be rechargeable batteries. Some examples of batteries include, but are not limited to, Lithium Ion (Li-ion) battery, Nickel Cadmium (NiCd) battery, and Nickel-Metal Hydride (NiMH) battery. The one or more batteries may or may not be replaceable. In another embodiment, the power source 114 may be a wired power source. In some implementations of the present disclosure, the fingerprint scanner 102 may include a port (not shown in FIG. 1) to connect to a power line for supplying power to the fingerprint scanner 102. In some implementations, the port may be a part of the wired communication component configured to receive power for the fingerprint scanner 102 or for charging the one or more batteries, in addition to communicate the data with other devices. The example of the port includes the USB port. In an example, the port may be used for sending software updates.

The fingerprint scanner 102 in the form of a toy may also include a plurality of play elements specifically designed to keep the children engaged and entertained. As can be seen in FIG. 2, the fingerprint scanner 102 includes six play elements 208-1, 208-2, 208-3, 208-4, 208-5, and 208-6 that may act as a fun activity for the children. In an example, the play elements 208-(1-6) may include a combination of sound elements, light elements, and display elements. For example, the sound elements may include balls and beads that produce playful sounds when the fingerprint scanner 102 is moved or shaken by the children. In an example, the light elements may include elements that may light up in response to a motion of the fingerprint scanner 102. Further, in an example, the display elements may include bright colored elements, such as buttons, images, LEDs, etc. that attract and hold the attention of the children during fingerprints and palmprint acquisition. In an example, the play elements 208-1 and 208-2 may be sound elements, the play elements 208-3 and 208-4 may be light elements, and the play elements 208-3 and 208-4 may be display elements. Although, it has been shown that the fingerprint scanner 102 includes six play elements 208-(1-6), in some aspects of the present disclosure, the fingerprint scanner 102 may include more than or less than six play elements.

In operation, when a user (for example, a child) grasps the fingerprint scanner 102 by holding the tube 202 in his or her palm and wrapping fingers around the tube 202 (see FIG. 3), a portion of the hand of the user holding the tube 202 is illuminated by the light sources 108-(1-3). Further, each of the camera sensors 104-(1-4) may partially or fully capture the images of fingers and/or hand of the user. In an example, the camera sensors 104-(1-4) captures images corresponding to respective sections of the hand while the light sources 106-(1-3) illuminate the sections from different directions/angles. For example, the camera sensor 104-1 may capture a first field of view of the hand as a first image and the camera sensor 104-2 may capture a second field of view of the hand as a second image. A portion of the first field of view of the camera sensor 104-1 and a portion of the second field of view of the camera sensor 104-2 represent a common field of view, also referred to as an overlapping part or an overlapping region or an overlapping portion. In an example, multiple overlapping images captured by the camera sensors 104-(1-4) may be stored in the memory 118 (not shown in FIG. 2) and/or communicated to the external computer device 230, 240.

In an embodiment, the fingerprint scanner 102 may use an artificial intelligence (AI) technique and/or a machine learning (ML) technique to recognize the hand including the fingers of the user holding the fingerprint scanner 102 differently i.e., not in a required manner or optimal position.

Figure 4:
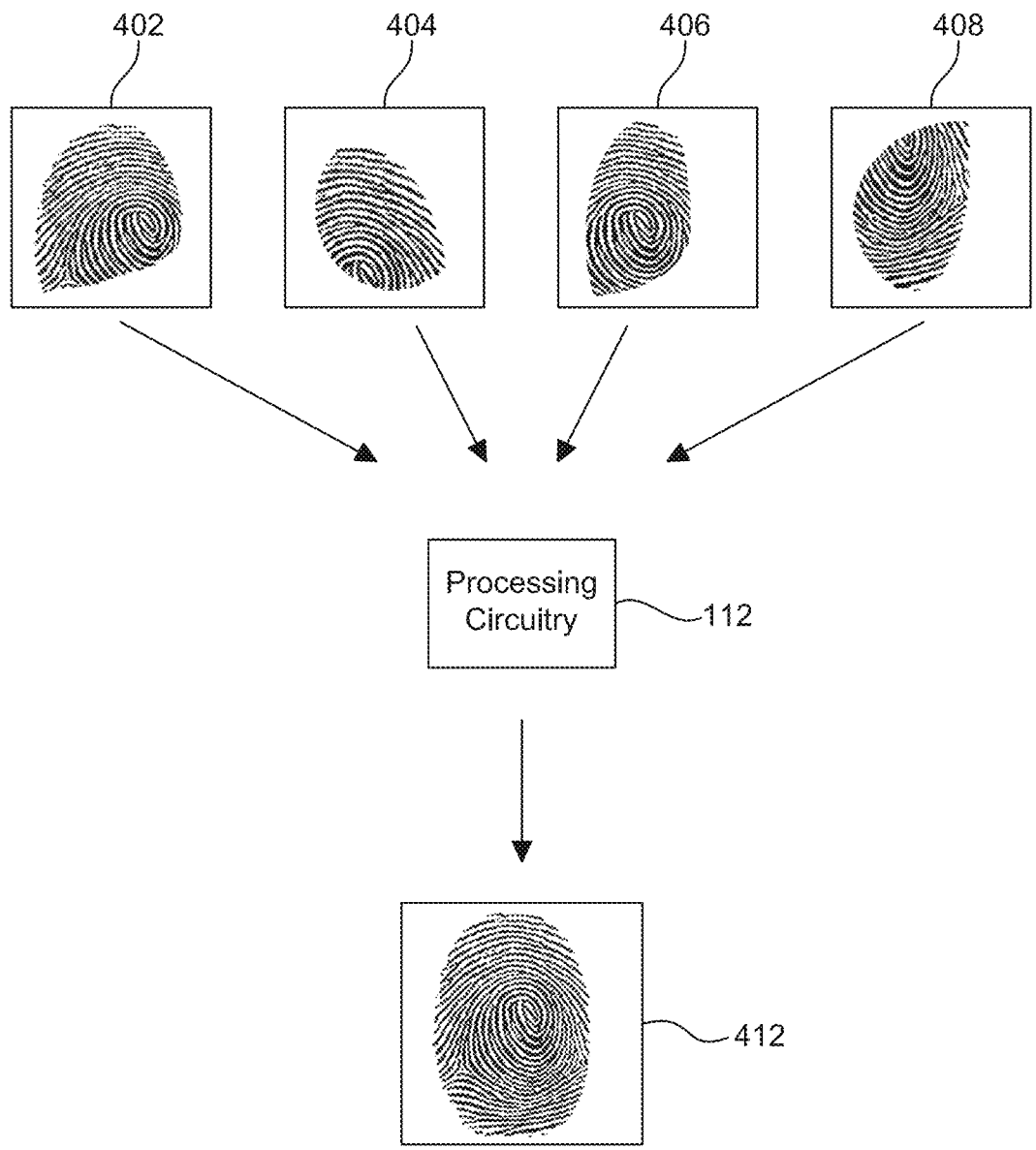
FIG. 4 shows images captured by camera sensors of the fingerprint scanner, according to aspects of the present disclosure.

FIG. 4 shows images captured by one or more camera sensors 104 of the fingerprint scanner 102 described in FIG. 2 and FIG. 3, according to aspects of the present disclosure. In operation, when an infant child grasps the fingerprint scanner 102 by holding the tube 202 in his or her palm and wrapping fingers around the tube 202, inner portions of the hand holding grasping the tube 202 of the infant/child user are illuminated by the light sources 108-(1-3). Further, the camera sensors 104 may partially or fully capture the images of fingerprints and/or palm of the infant child. Images of a fingerprint of an index finger captured by the one or more camera sensors 104 at different time intervals are shown in FIG. 4. In an example, the camera sensor 104-1 captures a first field of view of the index finger as an image 402 at time interval $T_1$ and a second field of view of the index finger as an image 404 at time interval $T_2$. Further, the camera sensor 104-2 captures a third field of view of the index finger as an image 406 at the time interval $T_3$ and a fourth field of view of the index finger as an image 408 at the time interval $T_4$.

In an aspect of the present disclosure, each camera sensor may be configured to capture an overlapping part or portion of the fingerprint of the index finger captured by its neighboring camera sensor. As can be seen in FIG. 4, the image 404 includes a portion of the fingerprint captured in the image 402. According to an aspect of the present disclosure, the captured images 402, 404, 406, and 408 may be communicated to the external computer device 230, 240 for processing. On receiving the multiple images 402, 404, 406, and 408, the external computer device 230, 240 may process the multiple images 402-408 to combine the multiple images 402, 404, 406, and 408 to generate a single image 412 of the fingerprint of the index finger of the infant child.

Figure 5:
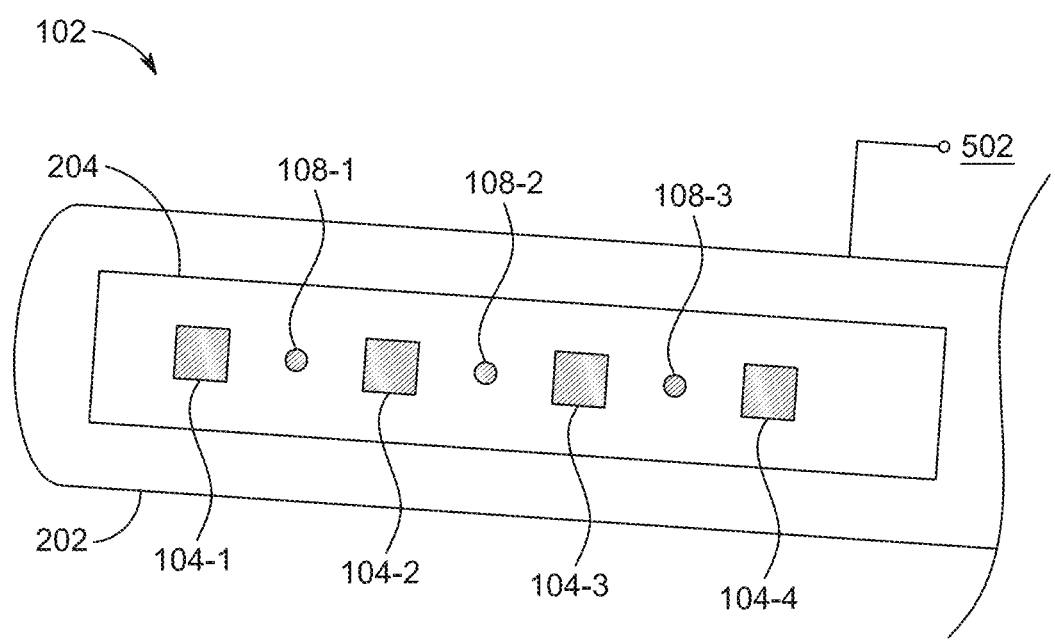
FIG. 5 shows an example arrangement of camera sensors in the fingerprint scanner, according to aspects of the present disclosure.

FIG. 5 shows an example arrangement of camera sensors 104 in the fingerprint scanner 102, according to aspects of the present disclosure.

As can be seen in FIG. 5, the camera sensors 104 are placed/arranged in a single array in the fingerprint scanner 102. In an example, the single array is a 4×1 camera sensor array enclosed in the tube 202 of the fingerprint scanner 102 and includes four camera sensors 104-1, 104-2, 104-3, and 104-4. Further, three light sources 108-(1-3) are placed/arranged in between the camera sensors 104-(1-4). As shown in FIG. 5, the light source 108-1 is placed in between the camera sensors 104-1 and 104-2, the light source 108-2 is placed in between the camera sensors 104-2 and 104-3, and the light source 108-3 is placed in between the camera sensors 104-3 and 104-4. Further, the fingerprint scanner 102 includes a port 502. The port 502 may serve as an interface for data communication between the fingerprint scanner 102 and other devices.

Figure 6:
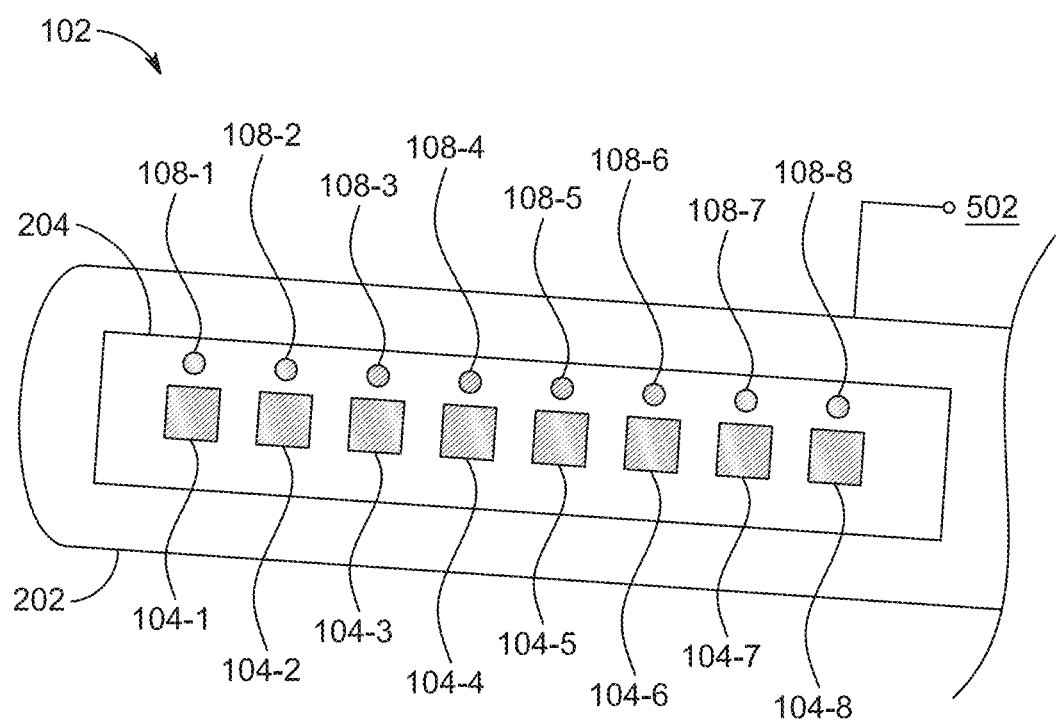
FIG. 6 shows another example arrangement of camera sensors in the fingerprint scanner, according to aspects of the present disclosure.

FIG. 6 shows another example arrangement of camera sensors 104 in the fingerprint scanner 102, according to aspects of the present disclosure.

As can be seen in FIG. 6, the camera sensors 104 are placed/arranged in a single array in the fingerprint scanner 102. In an example, the single array is an 8×1 camera sensor array enclosed in the tube 202 of the fingerprint scanner 102 and includes eight camera sensors 104-1, 104-2, 104-3, 104-4, 104-5, 104-6, 104-7, and 104-8. Further, eight light sources 108-(1-8) are placed/arranged alongside the camera sensors 104-(1-8). As shown in FIG. 6, the light source 108-1 is placed alongside the camera sensor 104-1, the light source 108-2 is placed alongside the camera sensor 104-2, the light source 108-3 is placed alongside the camera sensor 104-3, the light source 108-4 is placed alongside the camera sensor 104-4, the light source 108-5 is placed alongside the camera sensor 104-5, the light source 108-6 is placed alongside the camera sensor 104-6, the light source 108-7 is placed alongside the camera sensor 104-7, and the light source 108-8 is placed alongside the camera sensor 104-8. Since the light sources 108-(1-8) are placed alongside the camera sensors 104-(1-8) and not in between the camera sensors 104-(1-8), more number of camera sensors (i.e., more than four) could be arranged/placed in the tube 202 without increasing the size of the tube 202 and/or the fingerprint scanner 102.

Figure 7:
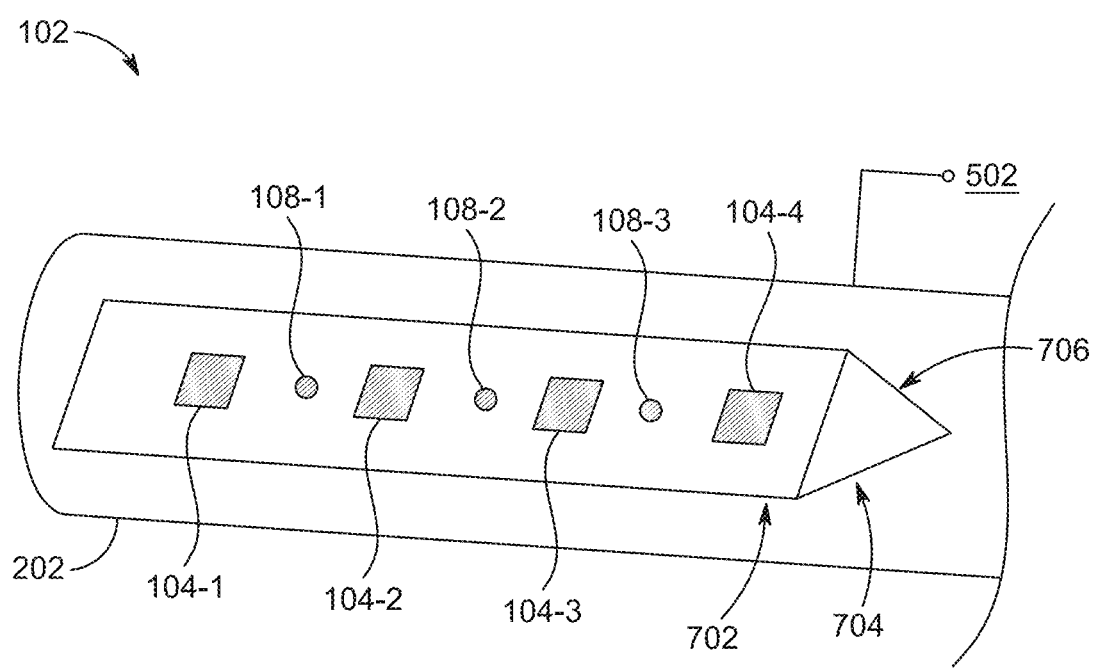
FIG. 7 shows an example arrangement of camera sensors in a form of a triangle in the fingerprint scanner, according to aspects of the present disclosure.

FIG. 7 shows an example arrangement of camera sensors 104 in a form of a triangle in the fingerprint scanner 102, according to aspects of the present disclosure.

As can be seen in FIG. 7, the camera sensors 104 are placed/arranged in three camera sensor arrays 702, 704, and 706 in the fingerprint scanner 102. As shown in FIG. 7, the camera sensor arrays 702, 704, and 706 are arranged in a geometry having a triangular cross-section (such as a triangular prism). In an example, the camera sensor array 702 is a 4×1 camera sensor array enclosed in the tube 202 of the fingerprint scanner 102 and includes four camera sensors 104-1, 104-2, 104-3, and 104-4. Further, three light sources 108-(1-3) are placed/arranged in between the camera sensors 104-(1-4). As shown in FIG. 7, the light source 108-1 is placed in between the camera sensors 104-1 and 104-2, the light source 108-2 is placed in between the camera sensors 104-2 and 104-3, and the light source 108-3 is placed in between the camera sensors 104-3 and 104-4. Likewise, each of the camera sensor array 704 and 706 is a 4×1 camera sensor array enclosed in the tube 202 of the fingerprint scanner 102 having similar arrangement of light sources 108 as the camera sensors array 702. In an example, the fingerprint scanner 102 that is shown in FIG. 7 includes twelve camera sensors 104 and nine light sources 108.

Figure 8:
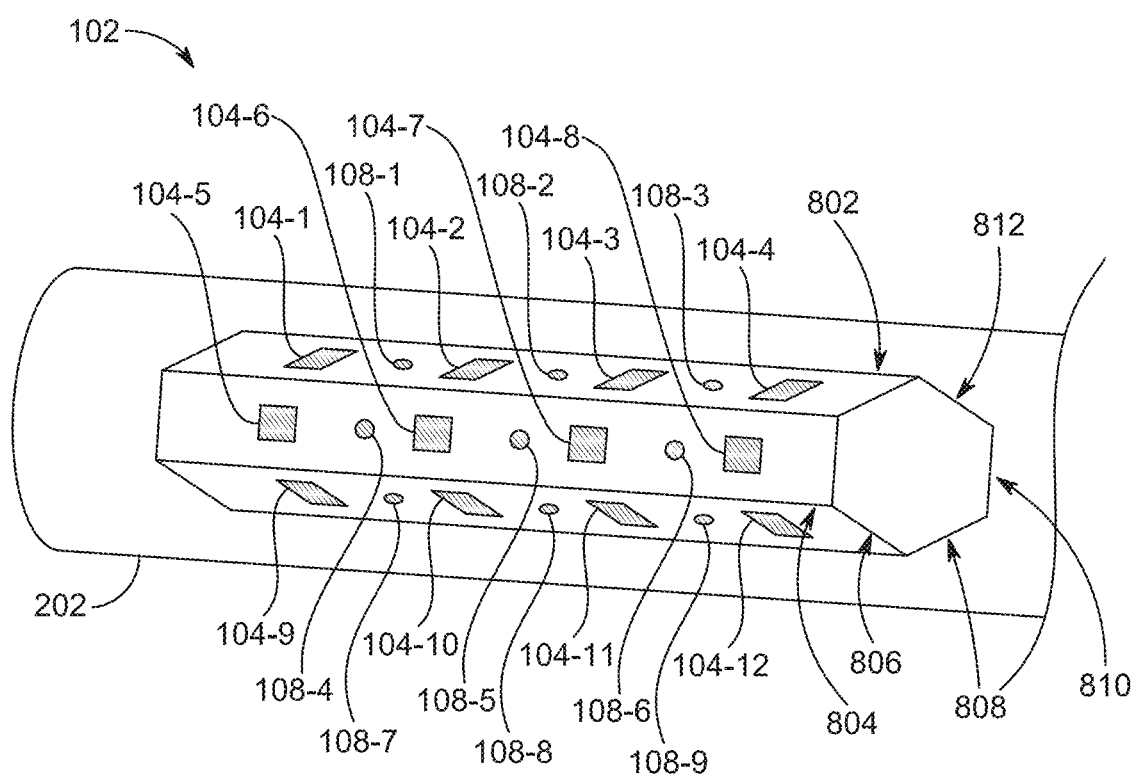
FIG. 8 shows an example arrangement of camera sensors in a form of a hexagon in the fingerprint scanner, according to aspects of the present disclosure.

FIG. 8 shows an example arrangement of camera sensors 104 in a form of a hexagon in the fingerprint scanner 102, according to aspects of the present disclosure.

As can be seen in FIG. 8, the camera sensors 104 are placed/arranged in six camera sensor arrays 802, 804, 806, 808, 810, and 812 in the fingerprint scanner 102. As shown in FIG. 8, the camera sensor arrays 802, 804, 806, 808, 810, and 812 are arranged are arranged in a geometry having a hexagonal cross-section (such as a hexagonal prism). In an example, the camera sensor array 802 is a 4×1 camera sensor array enclosed in the tube 202 of the fingerprint scanner 102 and includes four camera sensors 104-1, 104-2, 104-3, and 104-4. Further, three light sources 108-(1-3) are placed/arranged in between the camera sensors 104-(1-4). As shown in FIG. 8, the light source 108-1 is placed in between the camera sensors 104-1 and 104-2, the light source 108-2 is placed in between the camera sensors 104-2 and 104-3, and the light source 108-3 is placed in between the camera sensors 104-3 and 104-4.

Further, in an example, the camera sensor array 804 is a 4×1 camera sensor array enclosed in the tube 202 of the fingerprint scanner 102 and includes four camera sensors 104-5, 104-6, 104-7, and 104-8. Further, three light sources 108-(4-6) are placed/arranged in between the camera sensors 104-(5-8). As shown in FIG. 8, the light source 108-4 is placed in between the camera sensors 104-5 and 104-6, the light source 108-5 is placed in between the camera sensors 104-6 and 104-7, and the light source 108-6 is placed in between the camera sensors 104-7 and 104-8. Also, the camera sensor array 806 is a 4×1 camera sensor array enclosed in the tube 202 of the fingerprint scanner 102 and includes four camera sensors 104-9, 104-10, 104-11, and 104-12. Further, three light sources 108-(7-9) are placed/arranged in between the camera sensors 104-(9-12). As shown in FIG. 8, the light source 108-7 is placed in between the camera sensors 104-9 and 104-10, the light source 108-8 is placed in between the camera sensors 104-10 and 104-11, and the light source 108-9 is placed in between the camera sensors 104-11 and 104-12. Likewise, each of the camera sensor array 808, 810, and 812 is a 4×1 camera sensor array enclosed in the tube 202 of the fingerprint scanner 102 having similar arrangement of light sources 108 as the camera sensors array 802, 804, and 806. In an example, the fingerprint scanner 102 that is shown in FIG. 8 includes twenty four camera sensors 104 and eighteen light sources 108.

According to an aspect of the present disclosure, the example arrangement of camera sensors 104 in the form of the triangle (as shown in FIG. 7) and the example arrangement of camera sensors 104 in the form of the hexagon (as shown in FIG. 8) enable capturing images of a palm section including both horizontally and vertically when the hand is wrapped around the tube 202. For example, an image of fingertips and the palm of the user are captured by the camera sensors 104 based on which the fingerprints of all the figures and the palmprint may be identified. Resolution of the image captured by the camera sensors 104 may be based on a number of arrays of the camera sensors 104 in the fingerprint scanner 102. In an example, the more the number of arrays of the camera sensors 104 are, the higher is the resolution of the image captured by the camera sensors 104.

Figure 9:
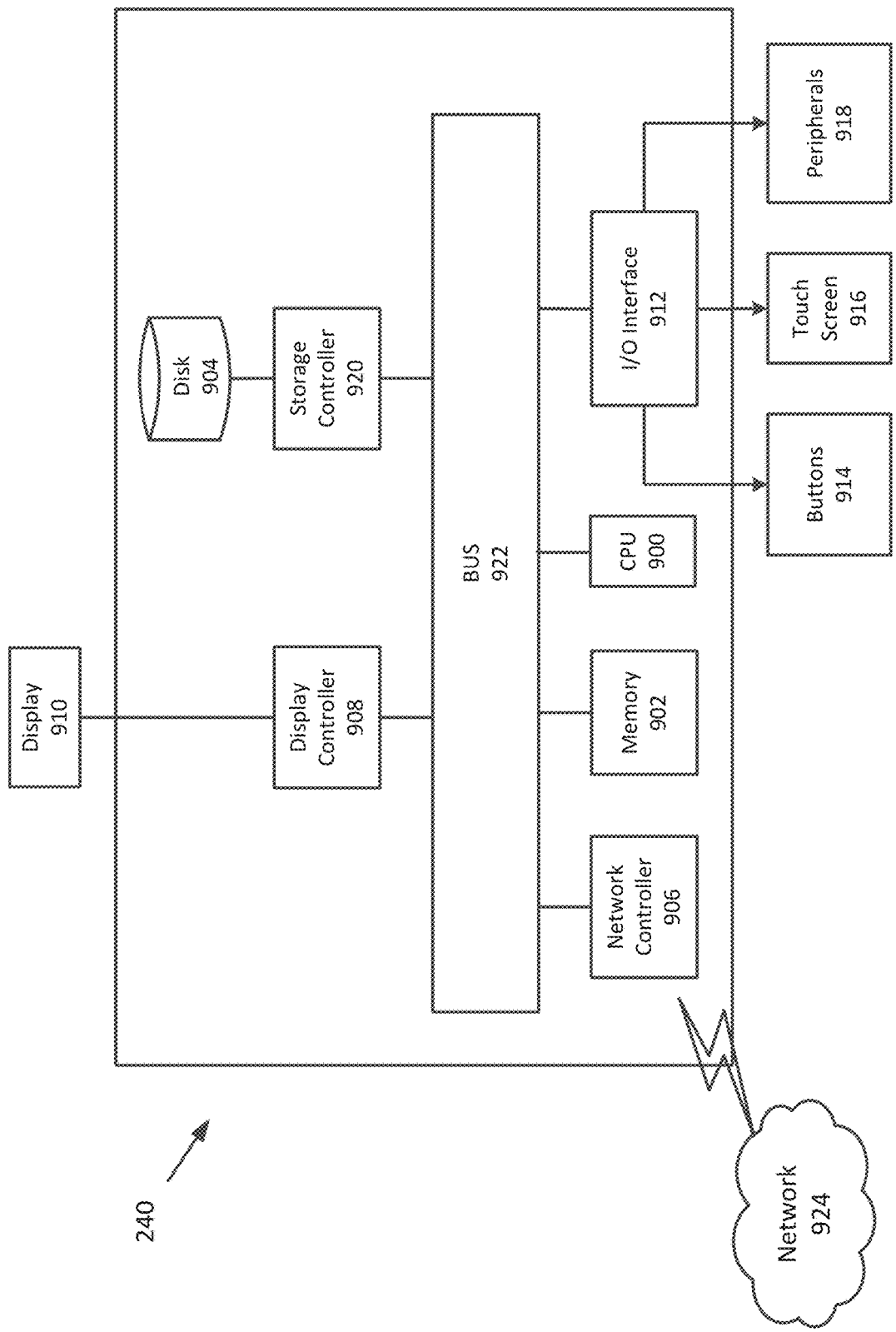
FIG. 9 is an illustration of a non-limiting example of details of computing hardware used in the computing system, according to certain embodiments.

FIG. 9 is an illustration of a non-limiting example of details of computing hardware used in the computing system, according to exemplary aspects of the present disclosure. In FIG. 9, an external computer device 240 is described and includes a CPU 900 which performs the processes described above/below. The process data and instructions may be stored in memory 902. These processes and instructions may also be stored on a storage medium disk 904 such as a hard drive (HDD) or portable storage medium or may be stored remotely.

Further, the external computer device 240 is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the external computer device 240 may be provided as a utility application, background daemon, or component of an operating system, or combination thereof, executing in conjunction with CPU 901, 903 and an operating system such as Microsoft Windows 7, UNIX, Solaris, LINUX, Apple MAC-OS and other systems known to those skilled in the art.

The hardware elements in order to achieve the external computer device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computer device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN subnetworks. The network 960 can also be wired, such as an Ethernet network, or can be wireless such as a cellular network including EDGE, 3G and 4G wireless cellular systems. The wireless network can also be WiFi, Bluetooth, or any other wireless form of communication that is known.

The external computer device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

The general-purpose storage controller 920 connects the storage medium disk 904 with communication bus 922, which may be an ISA, EISA, VESA, PCI, or similar, for interconnecting all of the components of the computing device. A description of the general features and functionality of the display 910, keyboard and/or mouse 914, as well as the display controller 908, network controller 906, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described.

According to some aspects of the present disclosure, the external computer device 230, 240 may receive the multiple overlapping images from the camera sensors 104-(1-4). In other aspects of the present disclosure, the external computer device 230, 240 may retrieve the multiple overlapping images from the memory 118. Upon receiving the multiple overlapping images, the external computer device 230, 240 may be configured to process the multiple overlapping images to generate/produce a single image of the hand including the fingertips and/or the palm of the user. The external computer device 230, 240 may then identify the palmprint and/or the fingerprints of all the fingers of the user based on the single image. In an aspect of the present disclosure, the external computer device 230, 240 may be configured to merge the multiple overlapping images (interchangeably referred to as multiple images) into the single image of the user's fingertips and palm. In an example, the external computer device 230, 240 may process the images to remove overlapping portions from the multiple images and recover the single image of the user's fingertips and palm. In some aspects of the present disclosure, the external computer device 230, 240 may process the multiple overlapping images to generate a separate image for each finger and the palm. For example, the external computer device 230, 240 may generate six images, one for each of a thumb, an index finger, a middle finger, a ring finger, a little finger, and the palm.

In some aspects of the present disclosure, the external computer device 230, 240 may determine overlapping regions/potions/parts between the multiple images received from the camera sensors 104-(1-4) and align the images accordingly. In an example, the external computer device 230, 240 may determine the overlapping regions using one or more algorithms available in OpenCV library. For example, the algorithms may be a set of state of art algorithms used for computer vision and machine learning.

Once the images are aligned, the external computer device 230, 240 may perform stitching of the images using one or more existing stitching algorithms available in OpenCV library. In an example, the external computer device 230, 240 may combine multiple images with overlapping fields of view using the one or more stitching algorithms to produce a segmented panorama or a high-resolution image, referred to as a stitched image hereinafter. Thereafter, the external computer device 230, 240 may be configured to unwrap the stitched image using a geometric correction technique or a geometric transformation technique to produce the single image of the user's fingertips and palm.

In an aspect of the present disclosure, the external computer device 230, 240 may initially wrap the stitched image based on an arrangement or a shape in which the camera sensors 104-(1-4) are arranged, i.e., in a triangular shape, a hexagonal shape, or any other shape or arrangement. Since, the camera sensors 104-(1-4) are arranged in a straight line (as shown in FIG. 2), the external computer device 230, 240 may wrap the stitched image accordingly. In an example, the external computer device 230, 240 may perform wrapping of the stitched image using one or more existing wrapping algorithms available in OpenCV library. Accordingly, the multiple overlapping images received from the camera sensors 104-(1-4) are merged into a single coherent image of the user's fingertips and palm. Thereafter, fingerprints of all five fingers and palmprint may be acquired from the single coherent image. In an aspect of the present disclosure, the images of the fingers and the palm are captured in a continued manner until desired/confident fingerprints and palmprint are not obtained.

Other ways to perform stitching and unwrapping of the images (overlapping images or non-overlapping images) are possible and whilst not explicitly discussed, are contemplated herein. In an example, in cases where there is a gap between the non-overlapping images, the fingerprint scanner 102 may use existing stitching algorithms or other such algorithms to fill in the gap between the non-overlapping images. Further, since the techniques of stitching and unwraping of images are well known techniques, these techniques are not explained in detail in the present disclosure for the sake of brevity.

In another example, each camera sensor may capture exclusive or non-overlapping images. Such images captured by the camera sensors 104-(1-4) may be stored in the memory 118 (not shown in FIG. 2) and/or communicated to the external computer device 230, 240. The images are processed as described above to recover the single image of the user's fingertips and palm.

Also, in certain cases, the camera sensors 104-(1-4) may capture broken images. A broken image may be understood as an image in which lines in fingerprint pattern are discontinuous or there is a gap in friction ridges. A broken image could be captured for any number of reasons. For example, a broken image may be captured due to an injury in the user's finger or due to presence of a foreign object (for example, a band-aid) on the finger. In such cases, the fingerprint scanner 102 may use an artificial intelligence (AI) technique, a machine learning (ML) technique and/or techniques available in open source computer vision (OpenCV), to process the broken images and fill in the gaps in the images.

The camera sensors 104-(1-4) may capture as many images as possible through the time the child holds the fingerprint scanner 102. The child may change the position by moving the position of fingers and/or palm time to time. The fingerprint scanner 102 recognizes such movements and the camera sensors 104-(1-4) continues to capture the images. The external computer device 230, 240 processes the captured images representing different positions to improvise and validate the developing single coherent image. A greater number of images may enable developing a good quality image of fingertips and/or palm.

According to some aspects of the present disclosure, the external computer device 230, 240 may be configured to simultaneously receive multiple images from the array of camera sensors 104. In some aspects of the present disclosure, the external computer device 230, 240 may retrieve the multiple images from the memory 118. The external computer device 230, 240 may also receive the multiple images one at a time. The external computer device 230, 240 may be configured to process the multiple images. In an implementation, the external computer device 230, 240 may be configured to process the multiple images simultaneously. In some implementations, the external computer device 230, 240 may be configured to process each image individually. In an example, the external computer device 230, 240 may process the multiple images to generate a single image of the user's fingertips and/or palm. In an example, the camera sensors 104 may capture image of fingers/palm in close proximity. This may result in overlapping or partial capturing of images of fingerprint and/or palm. Hence, images captured by camera sensors 104 may be processed to identify the overlaps or gaps in the images to generate a complete image of the fingerprints and the palm.

In an example, the external computer device 230, 240 may merge the multiple images by removing overlapping portions or stitching the partial portions to recover/develop a single image of the fingertips and/or the palm of the user (such as the infant child). For example, the external computer device 230, 240 may process the multiple images to identify patterns. The external computer device 230, 240 may compare the images to determine overlapping portions or partial portions in the images based on the patterns. The images may be processed to merge multiple overlapping images into or to develop a single coherent image by stitching partial portions of fingerprint and/or palmprint. In an aspect of the present disclosure, fingerprints of all five fingers (including thumb) of the user and a palmprint can be acquired from the multiple overlapping images or processing multiple partial portions of the fingerprints and/or the palmprint. In an example, the external computer device 230, 240 may employ one or more known stitching techniques and warping algorithms available in open source computer vision (OpenCV) library to generate the single image from the multiple overlapping images.

Referring back to FIG. 4, in an example, the external computer device 230, 240 may merge the multiple images 402, 404, 406, and 408 to remove overlapping portions and recover the single image 412 of the fingerprint. For example, the external computer device 230, 240 may process the multiple images to identify patterns. The external computer device 230, 240 may compare the multiple images 402, 404, 406, and 408 to determine overlapping portions in the multiple images 402, 404, 406, and 408 based on the patterns. The images 402, 404, 406, and 408 may be processed into or to develop a single coherent image. In an example, the external computer device 230, 240 may develop the single image 412 using existing stitching algorithms and unwraping algorithms available in OpenCV library. Likewise, the camera sensors 104-(1-4) may capture multiple images of all the fingers and the palm (i.e., the complete hand) of the infant child for fingerprints and palmprint acquisition. However, the multiple images are not shown in FIG. 4 for the sake of brevity.

Figure 10:
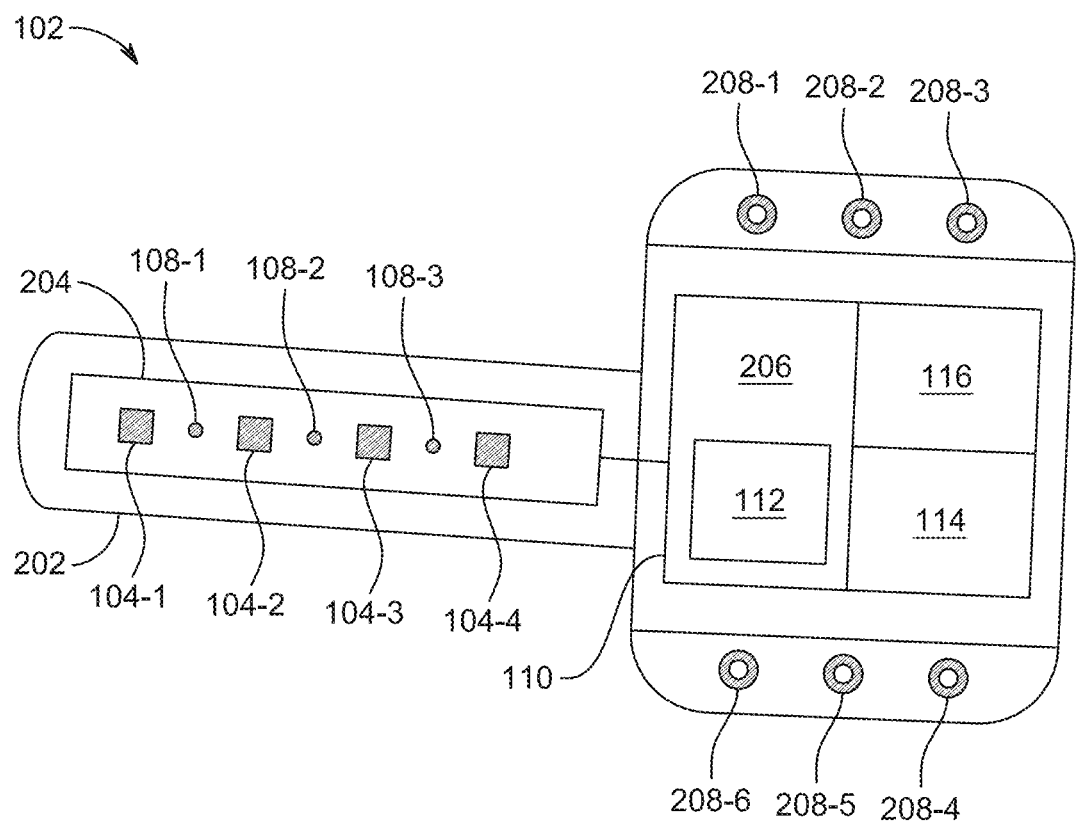
FIG. 10 shows a perspective view of the fingerprint scanner with an embedded computer, according to aspects of the present disclosure.

FIG. 10 shows a perspective view of the fingerprint scanner, according to aspects of the present disclosure. According to some aspects of the present disclosure, the processor compartment 110 may include an embedded computer system, such as a system on chip 206 that includes the processing circuitry 112. In some embodiments, the power source 114 and the communication unit 116 may be a part of the system on chip 206. An example of a system on chip 206 is a Qualcomm® Snapdragon™ system on chip.

According to some aspects of the present disclosure, the processing circuitry 112 of the system on chip 206 may be configured to simultaneously receive multiple images from the array of camera sensors 104. In some aspects of the present disclosure, the processing circuitry 112 may retrieve the multiple images from the memory 118. The processing circuitry 112 may also receive the multiple images one at a time. The processing circuitry 112 may be configured to process the multiple images simultaneously. In some implementations, the processing circuitry 112 may be configured to process each image individually. In an example, the processing circuitry 112 may process the multiple images to generate a single image of the user's fingertips and/or palm. In an example, the camera sensors 104 may capture image of fingers/palm in close proximity. This may result in overlapping or partial capturing of images of fingerprint and/or palm. Hence, images captured by camera sensors 104 may be processed to identify the overlaps or gaps in the images to generate a complete image of the fingerprints and the palm.

In an example, the processing circuitry 112 may merge the multiple images by removing overlapping portions or stitching the partial portions to recover/develop a single image of the fingertips and/or the palm of the user (such as the infant child). For example, the processing circuitry 112 may process the multiple images to identify patterns. The processing circuitry 112 may compare the images to determine overlapping portions or partial portions in the images based on the patterns. The images may be processed to merge multiple overlapping images into or to develop a single coherent image by stitching partial portions of fingerprint and/or palmprint. In an aspect of the present disclosure, fingerprints of all five fingers (including thumb) of the user and a palmprint can be acquired from the multiple overlapping images or processing multiple partial portions of the fingerprints and/or the palmprint. In an example, the processing circuitry 112 may employ one or more known stitching techniques and unwrapping algorithms available in open source computer vision (OpenCV) library to generate the single image from the multiple overlapping images.

Figure 11:
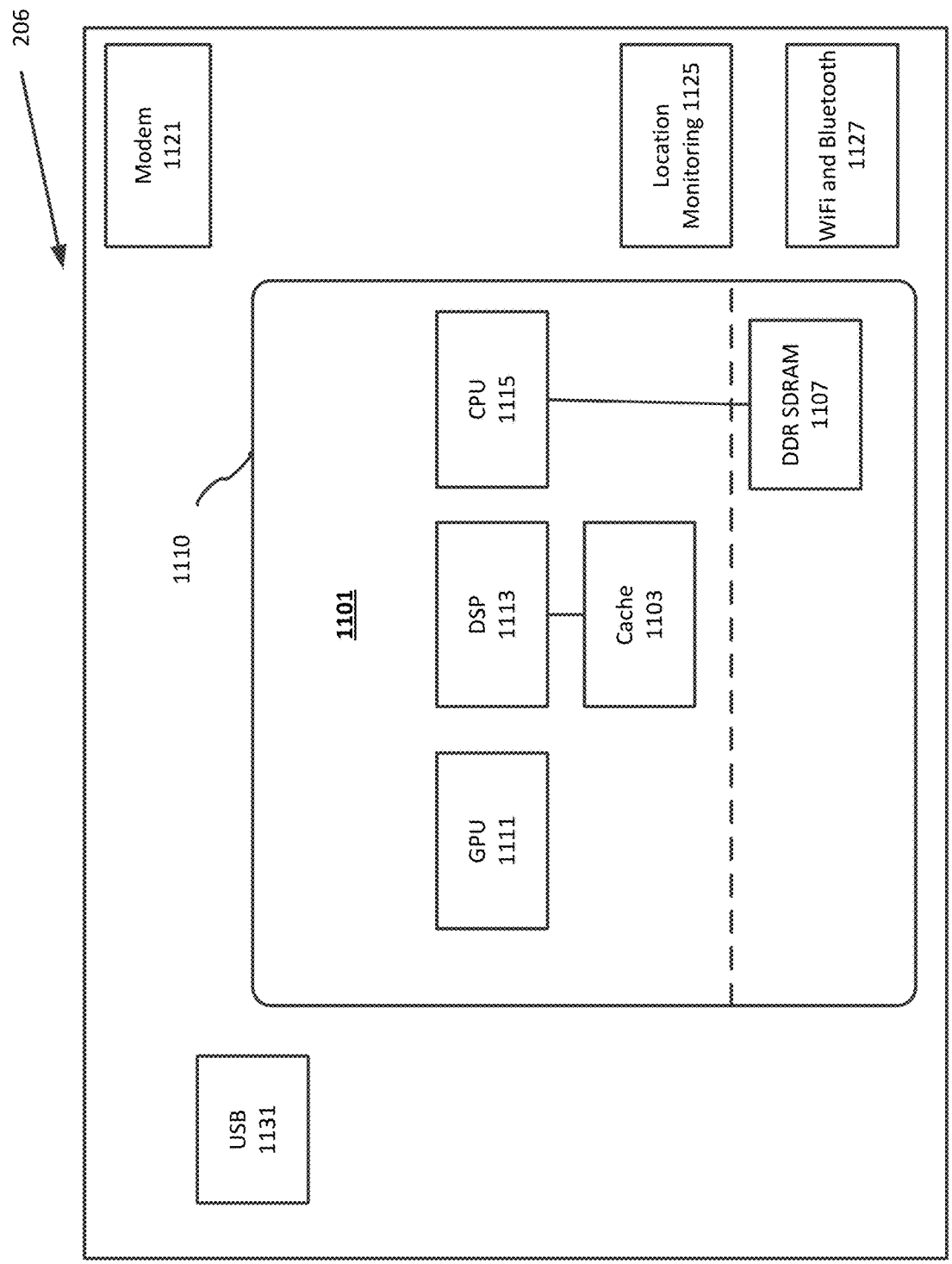
FIG. 11 is an illustration of a non-limiting example of details of computing hardware used in the embedded computing, according to certain embodiments.

FIG. 11 is a block diagram of a system on chip in accordance with an exemplary aspect of the disclosure. The system on chip 206 provides support for simultaneous camera sensor inputs, location services, wireless communications, and cellular services. The system on chip 206 includes a central processing unit (CPU) 1115, and may include a graphics processing unit (GPU) 1111 and a digital signal processor (DSP) 1113. The CPU 1115 may include a memory, which may be any of several types of volatile memory 1107, including RAM, SDRAM, DDR SDRAM, to name a few. The DSP 1113 may include one or more dedicated caches 1103 in order to perform computer vision functions. The GPU 1111 performs graphics processing for a high resolution display device. The GPU 1111, DSP 1113, CPU 1115, Cache 1103, and in some embodiments, a cellular modem 1121, may all be contained in the single system-on-chip (SOC) 206. The system on chip 206 may also include location service circuitry 1125, including GPS and dead reckoning, and connectivity service circuitry 1127, including WiFi, Bluetooth, Bluetooth Low Energy. The system on chip 206 may include one or more input/output ports, including USB connector(s) 1131, such as connectors for USB 2, USB 3, etc. In one embodiment, a version of the Qualcomm Snapdragon™ system on chip of a size sufficient to fit within the processor compartment 110 is a Snapdragon™ Wear Platform. A current configuration of a Snapdragon™ Wear Platform includes a Central Processing Unit, Qualcomm® Adreno™ Graphics Processing Unit, and DDR memory.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A fingerprint recording device with sound play, comprising:
   a transparent tube configured for an infant child hand;
   a processor compartment connected to one end of the transparent tube, wherein the processing compartment is wider than the transparent tube and contains processing circuitry and has a sound element and a display element mounted thereon;
   an array of camera sensors spaced apart on the transparent tube so that each camera sensor captures an overlapping part of an image captured by its neighboring camera sensor,
   wherein the array of camera sensors is arranged below a surface, along a periphery of a circumference and substantially along a length of the transparent tube up to the processor compartment;
   wherein the sound element includes balls and beads tethered to the one end of the transparent tube; and
   wherein the processing circuitry is configured to:
   simultaneously receive multiple images from the array of camera sensors, and
   process the multiple images including merging the multiple images to remove overlapping portions and recover a single image of the infant child's fingertips and palm.

2. The fingerprint recording device of claim 1, wherein the array of camera sensors is arranged so that a complete hand of the infant child can be captured both horizontally and vertically when it is wrapped around the transparent tube.

3. The fingerprint recording device of claim 1, wherein the processor compartment includes a battery power source.

4. The fingerprint recording device of claim 3, wherein the processor compartment includes a wireless communications transmitter for transmitting the multiple images to a remote device.

* * * * *